United States Patent [19]

Derrick

[11] 3,893,847

[45] July 8, 1975

[54] COMPOSITION OF MATTER AND PROCESS

[75] Inventor: Arthur Percy Derrick, Sylvania, Australia

[73] Assignee: Catoleum Pty. Limited, Botany, Australia

[22] Filed: July 19, 1971

[21] Appl. No.: 164,149

[30] Foreign Application Priority Data

Aug. 7, 1970  Australia............................. 2107/70

[52] U.S. Cl. .................... 75/3; 106/12; 260/29.6 S; 260/29.6 PT; 260/29.6 RW; 260/29.2 EP
[51] Int. Cl. ......................... C04b 25/00; C22b 1/14
[58] Field of Search........... 75/3; 106/193 J, 193 M, 106/12, 287 SS; 260/29.6 S, 29.6 PT, 29.6 RW

[56] References Cited

UNITED STATES PATENTS

| 2,651,619 | 9/1953 | DeMello et al. | 106/287 SS |
| 3,154,403 | 10/1964 | Stickley et al. | 75/3 |
| 3,418,237 | 12/1968 | Booth et al. | 75/3 |
| 3,644,113 | 2/1972 | Lang et al. | 75/3 |
| 3,652,497 | 3/1972 | Jonas et al. | 260/29.6 RW |

FOREIGN PATENTS OR APPLICATIONS

| 589,058 | 5/1960 | Canada | 260/DIG. 14 |

OTHER PUBLICATIONS

The Pharmacopeia of the United States of America, Eighteenth Revision, offical from Sept. 1, 1970, p. 12.

*Primary Examiner*—Allan Lieberman
*Attorney, Agent, or Firm*—Cushman, Darby & Cushman

[57] ABSTRACT

Agglomerates comprising a finely ground mineral and an effective amount of a high molecular weight substantially straight chain water soluble polymer and water and a process for using such a composition of matter in producing agglomerates having improved properties.

4 Claims, No Drawings

COMPOSITION OF MATTER AND PROCESS

This invention relates to new compositions of matter comprising a finely ground mineral and a high molecular weight substantially straight chain water soluble polymer and to a process of manufacturing agglomerates from such compositions, such agglomerates having improved properties.

It is customary to agglomerate certain finely ground minerals such as, for example, iron ores, so that the material may be transported readily and processed conveniently. The agglomerates are produced by first wetting the finely ground mineral with water before forming the wet material into agglomerates of suitable size and shape. The agglomerates are then indurated by heat.

Such agglomerates suffer from two disadvantages: firstly, the strength of the agglomerates before induration may not be high enough to prevent some disintegration due to handling; secondly, on heating, the agglomerates may disintegrate due to spalling caused by, for example, lack of physical strength or sudden uncontrollable release of free or bound moisture. Such uncontrollable or explosive release of moisture is obviously undesirable and leads to loss of production. The conventional method of overcoming this problem, for example, in iron ore pelletizing is by the addition of hydrated lime or bentonite to the finely ground mineral before agglomeration. This method is not always acceptable since to be effective the additive is required to be present typically in concentrations of about 0.5 percent w/w of the finely ground mineral and the amounts required lead to a major raw materials handling problem. Furthermore the need to purchase such large amounts of additive increases the total processing costs significantly. A further disadvantage in the case of metalliferous minerals is that as a result of this relatively large addition of additive the metal content of the final mineral agglomerates is reduced thus leading to a reduction of efficiency in subsequent extractive processes.

We have now found new compositions of matter from which agglomerates which do not suffer from these disadvantages may be produced.

Accordingly we provide agglomerates comprising a finely ground mineral, an effective amount of a high molecular weight substantially straight chain water soluble polymer and water.

We also provide a process of manufacturing agglomerates which process comprises mixing a finely ground mineral with an aqueous solution of an effective amount of a high molecular weight substantially straight chain water soluble polymer and treating the resultant mixture to form agglomerates.

By high molecular weight we mean a molecular weight of from 500,000 to 25,000,000, preferably from 1,000,000 to 20,000,000. Whilst it is preferred that the polymers be of the straight chain type a small proportion of branched chains in the polymers can be tolerated and polymers containing such small proportions of branched chains are included in our invention.

Among suitable polymers there may be mentioned, for example, polyacrylamide, polyacrylonitrile, and polymethylacrylamide. Suitable polymers may be derived from ethylenically unsaturated monomers, for example, acrylamide, acrylonitrile, and methylacrylamide. Copolymers prepared from the copolymerisation of acrylamide, acrylonitrile or methylacrylamide have also been found to be suitable. The alkali metal or alkaline earth metal salts of the polymers are also of use in our invention.

High molecular weight polymers such as polyalkoxylates formed from the condensation of ethylene oxide, propylene oxide or butylene oxide or mixtures thereof with water, alcohols or phenols have also been found to be suitable for use in our invention.

Preferably the high molecular weight substantially straight chain water soluble polymers used in our invention are water soluble polyelectrolytes. By polyelectrolyte we mean a polymer substituted with a number of ionic groups. Thus preferred polymers for use in our invention are, for example, polyacrylic acid; polymethacrylic acid; copolymers of acrylamide, acrylonitrile or methylacrylamide with acrylic acid or methacrylic acid; sodium salts of copolymers of maleic acid with, for example, styrene or methyl vinyl ether; carboxymethyl cellulose sodium salt; synthetically modified starch polymers e.g., a starch grafted polyacrylonitrile; polymers containing amino groups such as for example polymers of dimethylaminoethylmethacrylate; and polymers containing quaternary ammonium groups.

These polymers may be made by any suitable method known in the art.

The polymers described hereinabove may give a highly viscous solution in pure water. Such a solution may not be suitable under some circumstances for use in the conventional equipment used in, for example, the pelletization of iron ore; however, the viscosity of such an aqueous solution may be lowered by the addition of inorganic salts such as, for example, sodium chloride, sodium sulphate or potassium chloride. Naturally saline waters such as, for example, sea or underground water may be used. This is an economic advantage when the processing is carried out in areas where only saline water is freely available.

Suitable amounts of polymer which give satisfactory results are from 0.001 to 10 lbs. per ton of finely ground ore or mineral feed. We prefer to add from 0.01 to 5 lbs., more preferably from 0.02 to 2 lb., of polymer per ton of finely ground mineral.

The polymer is conveniently dissolved in the water used for mixing with the finely ground mineral. For example a concentration of polymer in sea water of from 0.01 to 1 percent w/w, preferably 0.05 to 0.5 percent w/w, is suitable for use in the water spray system of a conventional inclined rotating disc pelletizer, e.g., the Dravo Pelletizing Disc Equipment used in the manufacture of pellets of iron ore.

When agglomerates manufactured using our process as described hereinabove are indurated by heating in a furnace the degree of disintegration due to spalling due, for example, to lack of physical strength or to sudden uncontrollable release of free or bound moisture is reduced.

Accordingly we provide an improved process of manufacturing indurated agglomerates, which process comprises firstly, manufacturing an agglomerate from a mixture comprising finely ground mineral, a high molecular weight substantially straight chain water soluble polymer and water, and secondly, indurating said agglomerate by heat treatment.

The amount of heat treatment required to indurate the agglomerates depends in the main upon the nature of the agglomerate. In general the normal heat treatment required for the induration of conventional agglomerates or pellets, not of our invention, is suitable. Thus, for example, pellets made from finely ground iron ore may be indurated by heating the pellets slowly from ambient temperature to a temperature in the range of from 1200° to 1350°C in a conventional iron ore pellet straight grate, grate-kiln or shaft, furnace.

This invention may be used in the manufacture of agglomerates of any finely ground mineral. For example it may be used in the manufacture of briquettes from coal dust, the manufacture of bricks, especially refractory bricks and ceramics and also for the manufacture of pellets of finely ground ore such as for example iron oxides, copper oxides, barytes, lead and zinc sulphides and nickel sulphides.

Our invention may also be used in the manufacture of composite agglomerates for example, those comprising a mineral, a slag forming additive and a reducing agent. Such composite agglomerates may be used as feed to a smelting process.

A suitable size range for the metalliferous ores and minerals used in our invention is from 10 to 1000 microns, preferably in the size range from 20 to 300 microns.

The invention may also be used in the manufacture of catalyst pellets and supports for catalysts. A further embodiment is in the manufacture of fertilizer granules.

The invention is now illustrated by but by no means limited to the following examples, in which all parts are by weight.

EXAMPLE 1

Solutions of polymers in sea water were prepared by the following method.

5 parts of polymer were added to 995 parts of filtered sea water. The polymer was thoroughly wetted with the sea water before agitation was commenced. The mixture was agitated by means of a slow speed mechanical stirrer until substantially all the polymer had dissolved. These solutions were used as pelletizing aids in the manufacture of iron oxide pellets from Hamersley pelletizing feed.

Hamersley pelletizing feed is a finely ground hematite type iron ore (approximately 63% Fe) with a Blaine index of from 2,500 to 2,700. The solutions of polymers were diluted with sea water to give a polymer concentration of 0.1 percent w/w and this diluted solution was sprayed onto the Hamersley pelletizing feed on an 18 inch diameter inclined rotating disc pelletizer and in this manner pellets were prepared in the size range from one-fourth to three-eighths inch. The disc was inclined at 52° and rotated at 24 r.p.m. Comparative pellets were similarly prepared (a) in the absence of a pelletizing aid and (b) using 0.5 percent bentonite as a pelletizing aid. The unindurated pellets were analysed for pelletizing aid and water content. The average crush strength of the unindurated pellets prepared using each pelletizing aid was measured in a conventional crush strength testing machine. The average drop strength of the unindurated pellets was measured by determining the average number of times the pellets could be dropped 18 inches onto a hard surface without cracking. The apparatus used for the measurement of drop strength consisted of a series of 6 small boxes fitted with automatic release, spring loaded bottoms. The pellet dropped 18 inches onto a polished steel bar plate. Six pellets could be dropped simultaneously under reproducible conditions.

In an initial experiment pellets manufactured from Hamersley pelletizing feed without using a pelletizing aid were indurated. It was found that most spalling and pellet breakage occurred in the temperature range from 290° to 460°C. Negligible disintegration occurred on heating to temperatures above 550°C. Therefore in order to demonstrate the effect of the pelletizing aid on the degree of spalling and pellet breaking it was only necessary to partially indurate the pellets by heating them to 550°C.

Samples of the pellets prepared above using each pelletizing aid were partially indurated by slowly heating to 550°C. The percent w/w of fine material disintegrated from the pellets during this partial induration was measured by passing the partially indurated material over a one-eighth inch screen and weighing the separated fines.

The results obtained from pellets manufactured with the use of the various pelletizing aids are given in Table 1.

TABLE 1

| Pelletizing aid | lbs. of pelletizing aid per ton of iron oxide | % w/w moisture in pellet | Average crush strength (lb.) | Average Drop Strength | % w/w fines formed during heating |
|---|---|---|---|---|---|
| None | — | 7.5 | 2.5 | 2.5 | 2 |
| Bentonite | 11 | 7 | 3 | 4 | 1 |
| Polymer 1 * | 0.35 | 8 | 3.5 | 8.0 | 0.1 |
| Polymer 2 ** | 0.35 | 7.5 | 4.0 | 12 | 0.05 |
| Polymer 3 *** | 0.35 | 8 | 7 | 12 | 0.08 |

*Polyacrylamide approximately 2% hydrolysed molecular weight of approximately 3 million
** 2:1 Copolymer of acrylamide and sodium acrylate with a M.W. of approximately 3 million
*** Straight chain polyethylene oxide with a M.W. of approximately 10 million

EXAMPLE 2

In a further series of experiments the four copolymers A, B, C and D listed below were used as agglomeration aids to prepare pellets (i.e., agglomerates) of iron oxide. The polymers used are shown in Table 2.

TABLE 2

| | |
|---|---|
| A | 2:1 copolymer of acrylamide and sodium acrylate with a M.W. of approximately 3 million |
| B | 12:1 copolymer of acrylamide and sodium methyacrylate with a M.W. of approximately 9 million |
| C | 1:1 copolymer of acrylamide and sodium acrylate with a M.W. of approximately 5 million |
| D | Cationic copolymer of dimethyl aminoethyl methacrylate and acrylamide with a M.W. of approximately 9 million |

The sample of iron oxide used in these experiments had the analysis shown in Table 3.

TABLE 3

Ore Thermogravimetric, Chemical and Screen Analyses

Thermogravimetric data (10°C/min)

| | | |
|---|---|---|
| Free water loss | 70–350°F | 0.46% |
| Goethite water loss | 350–780°F | 2.20% |
| Kaolinite water loss | 780–1110°F | 0.68% |
| Limestone $CO_2$ loss | 1110–1650°F | 0.54% |
| Total weight loss | 70–1650°F | 3.88% |

Chemical Analysis (dry basis)

| | |
|---|---|
| Total Fe | 62.0% |
| $SiO_2$ | 3.9% |
| $Al_2O_3$ | 2.3% |
| CaO | 0.58% |

Wet Screen Analysis (B.S.S.)

| | |
|---|---|
| + 72 mesh | 3.60% |
| − 72 + 120 mesh | 7.72% |
| − 120 + 240 mesh | 18.00% |
| − 240 + 300 mesh | 4.74% |
| − 300 + 350 mesh | 3.34% |
| − 350 mesh | 62.60% |

Green pellets (i.e., agglomerates) were prepared from the ore in the following general manner using a 1 metre Head-Wrightson disc pelletizer. Dry ore was fed continuously to the disc from a Syntron vibratory hopper/feeder unit and the requisite amount of sea water or polymer/sea water solution was introduced via sprays.

The green pellets from the disc were screened on a Denver wire-mesh mechanical shaking screen and the −⅝ + ⅜ inch product was used for pellet property measurements and spalling tests.

The bulk density, pellet density, compressive strength, drop test strength free water spalling temperature of the agglomerates and a simulated plant grate speed for the induration of the agglomerates were measured in the following general manner.

Bulk Density Measurement

The bulk density of each preparation was determined by weighing a known volume (0.48 cu. ft.) of pellets.

Densities of the pellets were also determined by measuring the volume of a weighed sample of pellets immersed in kerosene (rho = 0.782 g/cc) in a volumetric flask. These are reported as pellet density and are a more reliable measure of pellet porosity than is bulk density.

Compressive Strength Measurement

The production of homogeneous samples from the disc was ensured by continuously monitoring the strengths of the pellets on a simple "kitchen scale" compression tester. More accurate statistical measurements of compressive strength of the graded product were subsequently carried out using a Showa pellet testing machine. In this machine a 5 Kg load cell was used to ascertain the strength of green pellets and a 500 Kg load cell used for fired pellets. The machine was operated with closure rate constant at 12 mm/min. In each case pellets were sized at 12.7 ± 1 mm prior to strength testing.

Drop-Testing of Pellets

Green pellets were dropped from a height of 18 inches onto a steel plate to ascertain their impact resistance. Ten pellets of each preparation within the 12.7 ± 1 mm size range were tested for a maximum of 30 drops. A progressive tally of breakages was made.

Determination of Temperature Sensitivity

The determination of the spalling temperature for each batch of pellets was carried out using a plant simulator developed in the CSIRO Mineral Laboratories at Ryde. In its "heat sensitivity temperature" measuring mode, it provides a temperature — and draught-controlled drying environment for small batches (20 to 25) of pellets. The gas velocity was set so that pellet spalling was the same as that which occurs in the top 1½ inches of a full height bed dried under simulated plant conditions. The sample of 20 to 25 pellets was suspended in the rig column in a wire basket. Drying temperatures were altered in successive runs to establish the "free water spalling temperature", i.e., the temperature which induces 1 to 5 free water spalls in a batch of pellets.

Simulated Plant Grate Speed

The hood temperature profile was determined that will allow maximum grate speed (and therefore production) without significant spalling. The same rig as was employed for heat sensitivity measurements was used but full bed height was investigated. Both updraught and downdraught operation was simulated and gas flow was monitored in terms of bed pressure drop. Initial screening was carried out in a glass pot simulator so that the bed of pellets could be observed during the drying/firing cycle. The data collected from the glass pot was verified using a hot body pot to simulate the low thermal loss conditions of a conventional plant.

Glass pot

A 3 inch diameter pyrex glass column was used and green pellet bed depth was 16 inches above a 4 inch hearth layer of pre-fired pellets. This bed depth follows plant practice. The bed was then subjected to a planned dyring programme involving changes in temperature and draught conditions which are attainable in a travelling grate-windbox environment of an industrial plant. The sequence simulates the movement of the bed along the travelling grate.

"Hot body" pot

The glass pot of the rig was replaced by a kaolinite-fibre refractory-lined steel chamber of 3 inch diameter. This can operate at temperatures up to and including firing temperatures. Thermal losses from the hot body simulator are sufficiently low to show that timetemperature profiles generated in this simulator are the same as those generated in a 14 inch pot grate plant simulator.

The results of these tests were as shown in Table 4.

TABLE 4

Results of Heat Sensitivity Measurements

| Experiment No. | 1 | 2 | 3 | 4 | 5 | 6 | 7 | 8 |
|---|---|---|---|---|---|---|---|---|
| Pelletizing Aid | A | B | B | B | — | — | C | D |
| Concentration (lb/ton fired pellets) | 0.3 | 0.3 | 0.3 | 0.15 | zero | zero | 0.3 | 0.3 |
| Feed Rate of ore to disc (lb/hr) | — | — | 500 | 500 | 500 | — | — | — |
| Green Pellet Moisture (%) | 8.1 | 7.8 | 8.0 | 7.6 | 7.4 | 7.5 | 9.4 | 8.3 |
| Pellet density (gm/cc) | 3.54 | 3.66 | 3.52 | 3.54 | 3.54 | 3.62 | 3.47 | 3.32 |
| Bulk density (P.C.F.) | 133 | 131 | 132 | 129 | 132 | 137 | 127 | 138 |
| Strength (Kg/pellet) | 2.7 | 4.1 | 4.8 | 2.9 | 2.5 | 2.7 | 1.9 | 4.0 |
| Drop test - drops to first break | 30 | 30 | — | — | — | 26 | — | 30 |
| " - breakages in 30 drops | 0 | 0 | — | — | — | 2 | — | 0 |
| Fired Pellet Strength (kg/pellet) | — | — | 324 | 307 | 308 | — | — | — |
| Free Water Spalling Temperature (heat sensitivity temp.) (°F) | 430 | 430 | 450 | 430 | 380 | 380 | 470 | 425 |
| Plant Grate Speed (sec/windbox) | — | — | 33 | 30 | 45 | 45 | 27 | — |
| Relative production rate (no additive conditions taken as 100) | — | — | 137 | 150 | 100 | 100 | 167 | — |

The hood temperature profits determined in Experiments 3, 4, 5, 6 and 7 to allow the maximum plant grate speed are shown in Table 5.

TABLE 5

| Experiment No. | 3 | 4 | 5 | 6 | 7 |
|---|---|---|---|---|---|
| Plant grate speed (sec/w.b.) | 33 | 30 | 45 | 45 | 27 |
| Hood temperature profile * (°F) | | | | | |
| Windbox No. 1 | 250 | 250 | 250 | 250 | 250 |
| 2 | 340 | 290 | 340 | 340 | 340 |
| 3 | 410 | 360 | 350 | 350 | 360 |
| 4 | 430 | 400 | 360 | 360 | 380 |
| 5 | 460 | 420 | 370 | 370 | 400 |
| 6 | 480 | 420 | 380 | 380 | 420 |
| 7 | 500 | 420 | 390 | 390 | 440 |
| 8 | 530 | 520 | 450 | 440 | 535 |
| 9 | 480 | 430 | 380 | 395 | 500 |
| 10 | 410 | 390 | 330 | 350 | 460 |
| 11 | 410 | 390 | 330 | 350 | 460 |
| 12 | 460 | 400 | 360 | 370 | 460 |
| 13 | 530 | 440 | 380 | 390 | 480 |
| 14 | 610 | 520 | 400 | 430 | 515 |
| 15 | 700 | 590 | 460 | 525 | 570 |
| 16 | 780 | 670 | 590 | 620 | 680 |
| 17 | 810 | 720 | 750 | 780 | 770 |
| 18 | 840 | 750 | 810 | 810 | 890 |
| 19 | 970 | 900 | 840 | 840 | 1050 |
| 20 | 1150 | 1050 | 1040 | 1035 | 1220 |
| 21 | 1330 | 1220 | 1240 | 1240 | 1400 |
| 22 | 1600 | 1600 | 1600 | 1600 | 1600 |
| 23 | 1600 | 1600 | 1600 | 1600 | 1600 |
| 24+ | 2500 | 2500 | 2500 | 2500 | 2500 |

* Windboxes 1-7 downdraught 17" w.g.
Windboxes 8-18 updraught 17" w.g.
Windboxes 19+ updraught 12" w.g.

EXAMPLE 3

This example demonstrates the effect on viscosity of aqueous solutions of polyelectrolytes by the addition of inorganic salts. The viscosities were measured at 60°F using a Brookfield Viscometer and a No. 1 and No. 2 spindle both at 10 r.p.m. The results are shown in Table 6 using solutions of Polymers B and C of Example 2.

TABLE 6

| Polymer | Concentration of Polymer % w/w | Viscosity in pure water in centipoise | Viscosity in 3% aq. sodium chloride in centipoise | Viscosity in 3% aq. sodium sulphate in centipoise |
|---|---|---|---|---|
| C | 0.1 | 680 | 10 | 10 |
| C | 0.2 | 1340 | 17 | 22 |
| C | 0.3 | 1860 | 30 | 36 |
| B | 0.25 | 225 | 6 | 10 |
| B | 0.5 | 475 | 10 | 21 |
| B | 0.75 | 870 | 10 | 47 |

I claim:

1. A process of manufacturing indurated agglomerates which process comprises mixing a finely ground mineral in the size range from 10 to 1,000 microns with an aqueous solution of from 0.001 to 10 lbs. polymer per ton of said finely ground mineral, said polymer being a substantially straight chain water soluble polymer having a molecular weight from 1,000,000 to 20,000,000, treating the resultant mixture to form green agglomerates and indurating said green agglomerates by heating.

2. A process according to claim 1 wherein the polymer is dissolved in an aqueous solution of an inorganic salt before mixing with the finely ground mineral.

3. A process according to claim 2 wherein the concentration of polymer is from 0.01 to 1 percent w/w in sea water.

4. A process according to claim 3 wherein the concentration of polymer is from 0.05 to 0.5 percent w/w and the green agglomerates are made on an inclined rotating disc pelletizer.

* * * * *